(12) United States Patent
Fountaine

(10) Patent No.: US 6,952,916 B1
(45) Date of Patent: Oct. 11, 2005

(54) MULTI-LINK CONNECTOR

(75) Inventor: Howard Fountaine, Auckland (NZ)

(73) Assignee: ASSA Abloy Financial Services AB, (SE)

( * ) Notice: Subject to any disclaimer, the term of this patent is extended or adjusted under 35 U.S.C. 154(b) by 0 days.

(21) Appl. No.: 09/720,064

(22) PCT Filed: Jun. 10, 1999

(86) PCT No.: PCT/NZ99/00078

§ 371 (c)(1),
(2), (4) Date: Dec. 18, 2000

(87) PCT Pub. No.: WO99/66161

PCT Pub. Date: Dec. 23, 1999

(30) Foreign Application Priority Data

Jun. 18, 1998 (NZ) ...................................... 330714

(51) Int. Cl.[7] .............................................. F16G 13/06
(52) U.S. Cl. ................... 59/78.1; 59/78; 59/5
(58) Field of Search ........................... 59/78.1, 900, 78, 59/4, 5; 248/49, 51

(56) References Cited

U.S. PATENT DOCUMENTS

| 3,911,802 | A | * | 10/1975 | Morden | 454/129 |
| 5,042,244 | A | * | 8/1991 | Worsley | 59/78 |
| 5,156,574 | A | * | 10/1992 | Gai | 474/155 |
| 5,896,702 | A | * | 4/1999 | W.ae butted.hrens et al. | 49/325 |
| 6,029,437 | A | * | 2/2000 | Hart | 59/78 |
| 6,662,545 | B1 | * | 12/2003 | Yoshida | 59/78 |
| 6,725,642 | B2 | * | 4/2004 | Tsutsumi et al. | 59/78.1 |

* cited by examiner

Primary Examiner—David Jones
(74) Attorney, Agent, or Firm—Blakely Sokoloff Taylor & Zafman

(57) ABSTRACT

A multi-link connector which is particularly suitable for use with a window operator. The multi-link connector includes a plurality of links (12) joined together by a joining arrangement (11). The links (12) include a base (13) and a pair of oppositely disposed walls (14) so that the links (12) form a generally channel shaped elongate length. The joining arrangement (11) provides a plurality of drive elements (11a) which extend transversely between the walls (14) and are accessible through a gap (16) formed between the walls.

13 Claims, 6 Drawing Sheets

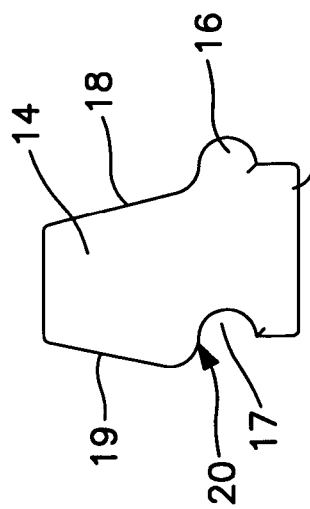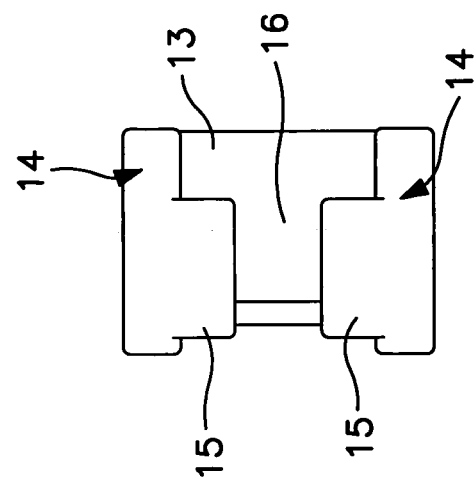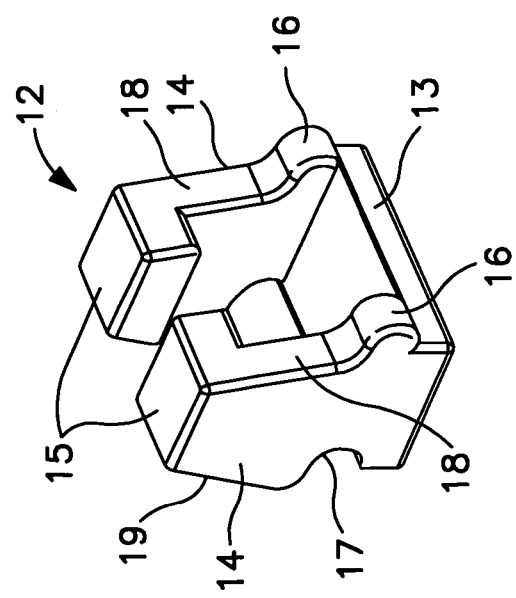

MULTI-LINK CONNECTOR

BACKGROUND OF THE INVENTION

This invention relates to a connector and more particularly a multi-link connector which has particular application with a window operator.

Operators for moving a window between opened and closed positions are known. A window operator can include a chain which extends from the housing of the operator to a window sash. By turning a handle mounted with the housing the chain can be wound out of or into the housing so as to respectively open or close the window. An operator of this type is, for example, disclosed in WO 95/20091 of Interlock.

A novel form of multi-link connector is disclosed in WO 95/20091. The multi-link connector is able to curve in one plane though limited curvature in a plane at right angles thereto is possible as is known with window operators of this type. The multi-link connector is also able to withstand compressive forces. According to the arrangement disclosed in WO 95/20091 the connectors are maintained in an interfitted array by an elongated flexible joining element which, in addition to keeping the links in the interfitting arrangement, provide strength to withstand tensile forces applied to the multi-link connector.

The window operator and in particular the multi-link connector disclosed in WO 95/20091 has proved to be very successful. However, there are applications where it is necessary to scale the operator down in size so that it can, for example, fit within an extrusion or some other element of the window frame or can be fitted to the window frame externally but in an unobtrusive manner. When scaled down for such end purposes, however, the functional requirements of the multi-link connector can become compromised to the point that the connector does not function satisfactorily.

With such multi-link connectors when used in a window operator application, it is necessary to be able to transfer a rotary driving force applied via the handle and an associated toothed gear wheel to the connector so that the connector can be driven from and back into the housing. With the arrangement shown in WO 95/20091, the links of the multi-link connector are provided with drive protrusions. However, when the connector is "down-sized" it becomes difficult to provide drive protrusions of the required size and spacing while still maintaining the strength and integrity of the protrusions and the connector overall.

This is generally not a problem with conventional chain connectors of known window operators. However, as discussed in WO 95/20091 a chain is not of an aesthetically pleasing appearance. With window hardware it is now more important that the hardware have as much aesthetic appeal as functionality.

SUMMARY OF THE INVENTION

It is an object of the present invention to provide an improved multi-link connector which is particularly suitable for use with a window operator.

Broadly, according to one aspect of the present invention, there is provided a multi-link connector including a plurality of links joined together by joining means, the links forming a generally channel shaped elongate length with the joining means forming drive elements which extend transversely between the walls of the channel shape and are accessible from between the walls.

According to the preferred form of the invention, the multi-link connector is able to only be bent in one direction from a first position. In the first position, base portions of adjacent of the links engage to prevent the connector from being bent in a direction other than said one direction. The edges of wall portions of the links are profiled to provide clearance to permit the connector to be bent in said one direction.

In a preferred form of the invention the links are of die cast construction. The links can be plated.

According to one form of the invention the joining means includes a multi-link chain. A second form of the invention has joining means which include a pin integrally formed with and projecting from a said wall portion and pivotally fixed to an oppositely disposed wall portion of an adjacent link.

BRIEF DESCRIPTION OF THE DRAWINGS

FIG. 2 is a perspective view of one of the links of the connector shown in FIG. 1, FIG. 3 is a side elevation view of the link shown in FIG. 2, FIG. 4 is a plan view of the link shown in FIGS. 2 and 3.

DETAILED DESCRIPTION OF EMBODIMENTS OF THE INVENTION

Figure 1:
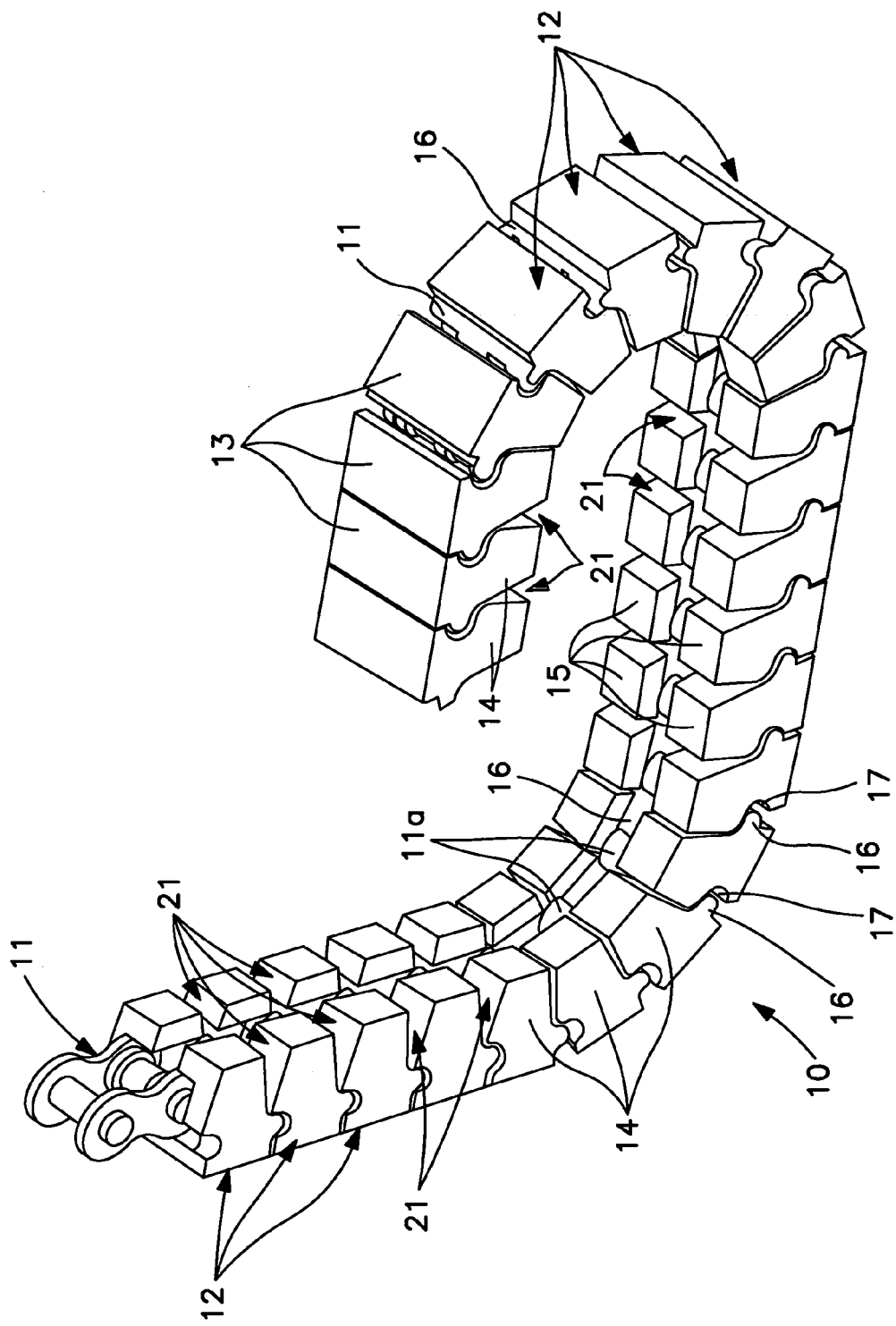
FIG. 1 is a perspective illustration of one form of the multi-link connector according to the invention.

As shown in FIG. 1, the multi-link connector 10 includes a joining means which in this form of the invention is a multi-link chain 11 which in the preferred form is of conventional construction. This chain 11 is located within a plurality of inter-engaging links 12, each link being of the type as illustrated in FIGS. 2–4. In the preferred form of the invention, these links 12 are of cast zinc alloy construction with a chrome plate finish. However, it will be appreciated by those skilled in the art that the links can be manufactured from other suitable materials and with other suitable surface finishes.

Each link 12 is of generally U-shape having a base 13 and upwardly projecting sides 14 with opposed returns 15 extending inwardly from the distal ends of sides 14 but terminating such as to provide a gap 16 therebetween. As will be explained hereinafter, the gap 16 enables the peripheral edge or teeth of a gear wheel to drivingly engage with the transversely extending pins 11a of the chain 11 in a conventional manner.

Projecting from edge 18 of each wall 14 and adjacent base 13 is a projection 17a. In a like manner, a recess 17 is formed in each of the opposite edges 19 of walls 14. Recesses 17b are positioned and shaped commensurate with the projections 17a so that when the links 12 are inter-engaged as shown in FIG. 1, the projections 17a engage with respective recesses 17b of the next adjacent link. As shown in FIG. 1, the projections 17a can be formed as a single continuous projection.

It will also be noted (more particularly from FIG. 3) that edges 18 and 19 of wall 14 extend in a generally convergent direction relative to base 13. Once again, with reference to FIG. 1, it will be seen that these inclined walls 18 and 19 provide a clearance 21 when the links 12 in the multi-link connector are positioned in an aligned manner, ie with bases 13 substantially in the same plane.

However, as the multi-link connector curves in the direction in which curvature is permitted, the projections 16 slide and rotate on surface 20 where wall 19 merges into recess 17b until such point that the clearance is taken up and the walls 18 and 19 of adjacent links at least in part engage. This engagement, therefore, limits the extent by which the multi-link connector can curve in the single direction of curvature permitted by the links 12. Curvature in the opposite direction is prevented by inter-engagement of the edge surfaces of bases 13 of adjacent links.

Therefore, not only do the links 12 in a simple yet effective means provide a limitation and degree of control to the extent of curvature in one direction of multi-link connector 10, the links also result in a multi-link connector which is aesthetically more pleasing than a chain element. In doing so, the links 12, nevertheless, still enable the teeth of a toothed gear wheel to locate through gap 16 to drivingly engage with the multi-link chain 11.

Figure 5:
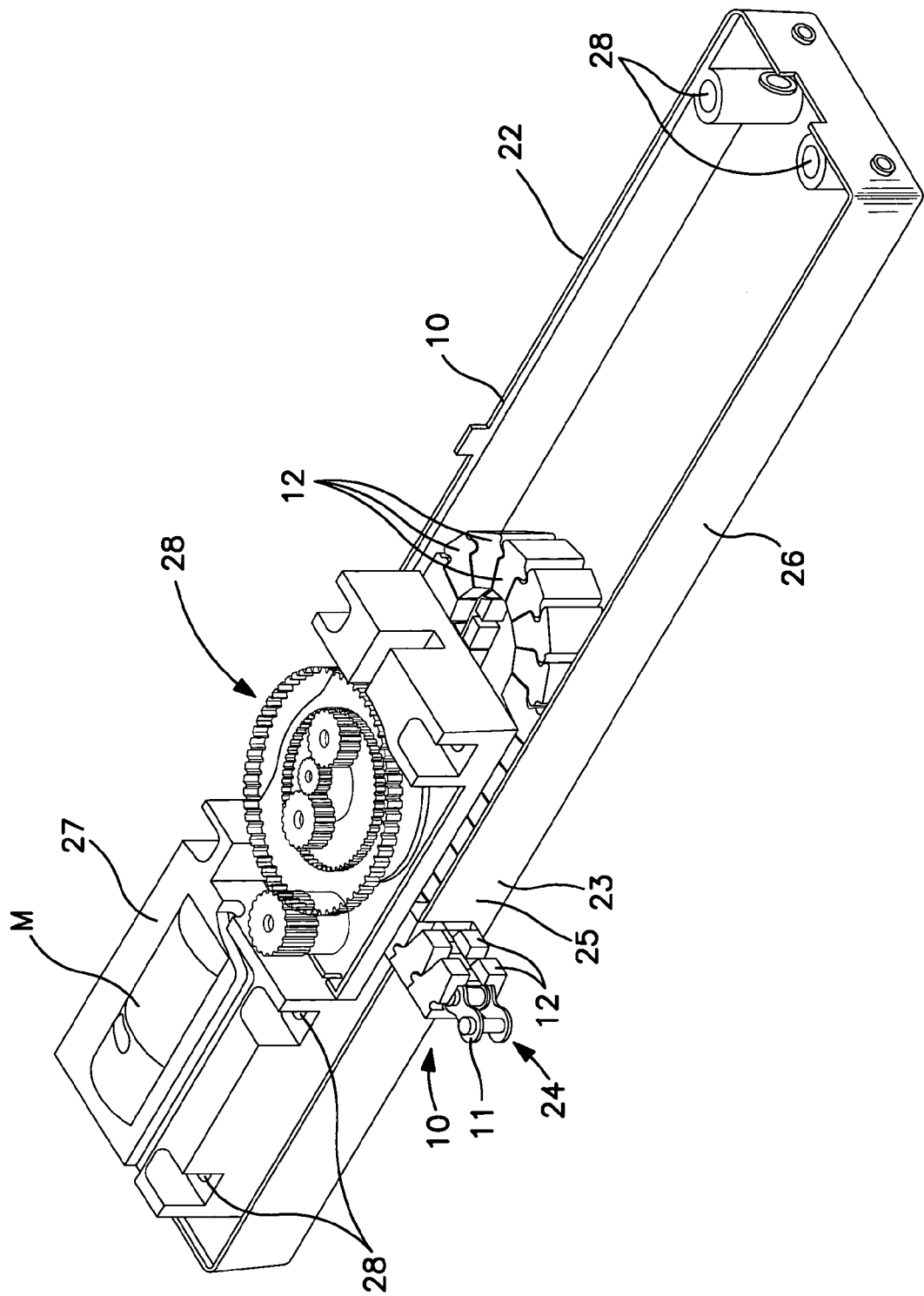
FIG. 5 is a perspective illustration of an operator incorporating the multi-link connector of FIG. 1, the operator being shown without its removable cover in position.

A possible construction of operator using the multi-link connector 10 is shown in FIG. 5. The operator includes a housing formed by a base 22 on which a cover (not shown) can be removably engaged. It will be appreciated by those skilled in the art that the housing is of slim line construction and can therefore be mounted within an extrusion or other frame element of a window frame or mounted in a largely unobtrusive manner to an external surface of the window frame. Apertures 28 in base 22 permit mechanical fasteners to fasten the base to a structure such as a window frame.

The multi-link connector 10 is located within the base 22 and is anchored by one end (eg at 23) within the base 22. The distal end 24 of the multi-link connector 10 extends through an opening 25 in a side wall 26 of the base 22. This distal end 24 is provided with a suitable attachment means whereby it can be attached (preferably in a removable manner) to a part of the window sash.

A mounting 27 located within the base 22 mounts an electric motor M which drives via a planetary gear arrangement 28, a gear wheel (not shown) which, as previously described, engages through gaps 16 in the links 12 with the chain 11. In the preferred arrangement, the planetary gear 28 is mounted via part of the mounting 27. The planetary gear arrangement 28 provides smooth and quiet operation.

Therefore, via suitable electrical controls, the motor M can be driven to rotate the gear wheel and hence move the distal end 24 of the multi-link connector away from or toward opening 25 depending on whether or not the window sash is to be opened or closed.

Figure 6:
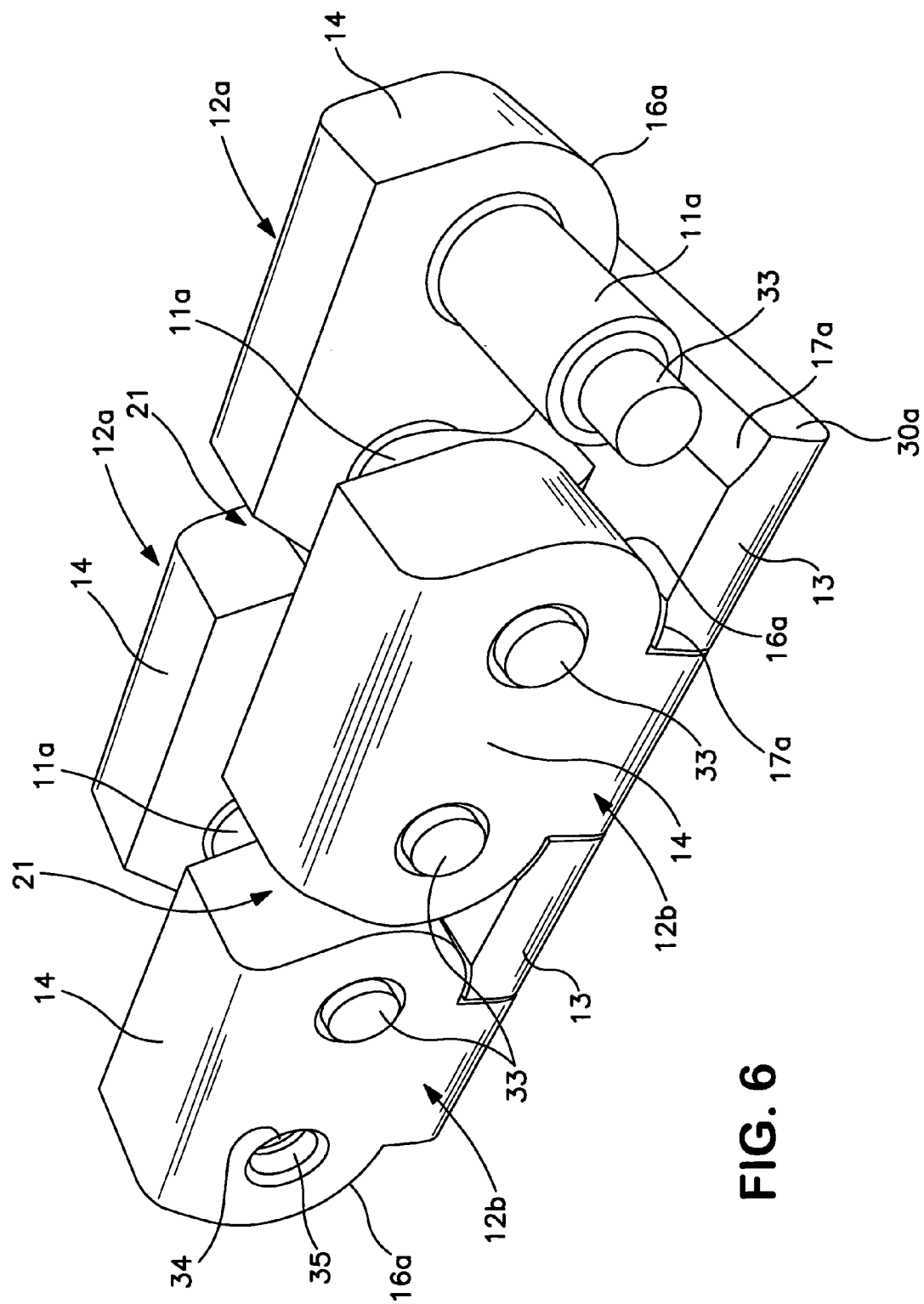
FIG. 6 is a perspective view of a part length of a second form of the multi-link connector according to the present invention.
Figure 7:
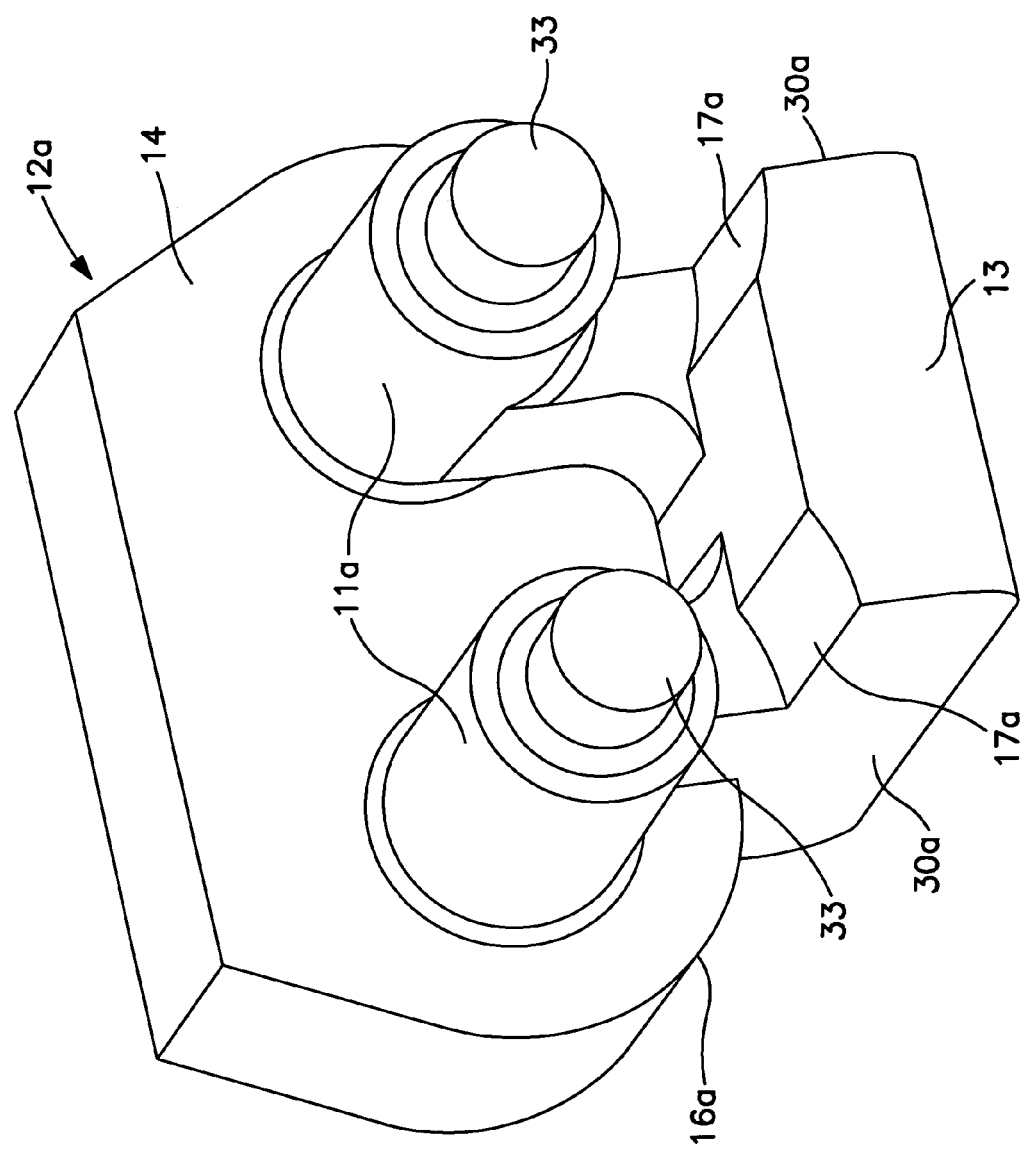
FIG. 7 is a perspective view of one of the links of the connection as shown in FIG. 6.
Figure 8:
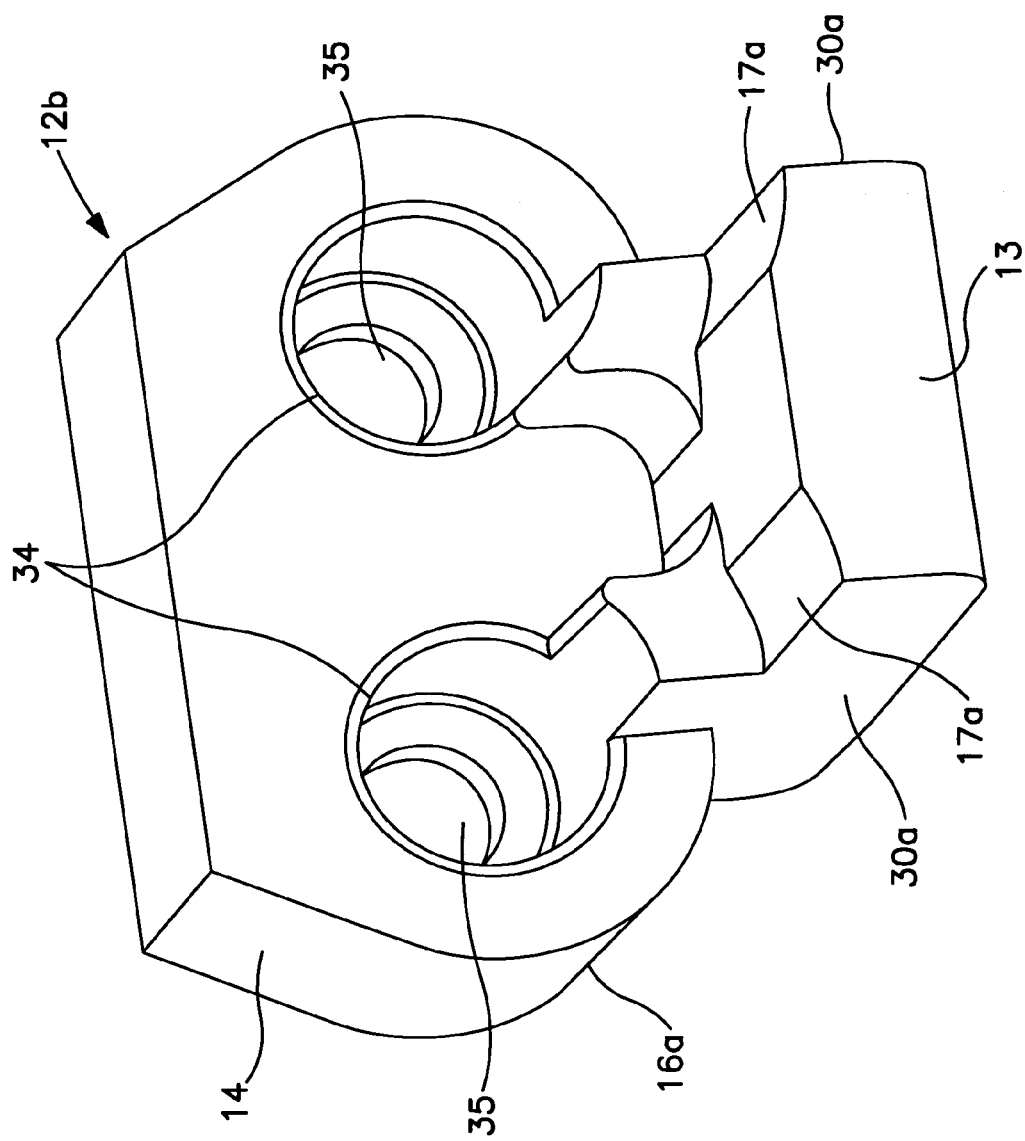
FIG. 8 is a perspective view of a second of the links of the connector shown in FIG. 6.

Referring now to FIGS. 6–8, there is shown a second form of the multi-link connector 10 according to the present invention. According to this form of the invention, the links 12 of the connector are effectively formed by a male link 12a and a female link 12b which alternate in a staggered array on opposite sides of the connector as shown in FIG. 6. Thus, as with the first embodiment, the connector 10 is of generally channel shape.

Male link 12a includes base portion 13 and a wall portion 14 which projects upwardly from one end of the base portion 13. Projecting in the same direction as base portion 13 and from what in use constitutes the inner wall surface of the wall portion 14 are a pair of spigots or pins 11a. Each pin 11a has a distal end 33 of reduced diameter.

The female link 12b is of similar form except that it has a pair of bores 35 which extend in from the inner face of wall portion 14. The bores 34 are formed with an end opening 35 of reduced diameter, this being slightly greater than the diameter of the distal ends 33 of the pins 11a.

As can be seen more clearly in FIG. 6, a pair of male and female links 12a and 12b are disposed opposite one another so that the bases 13 are located essentially edge to edge and the ends of the pins 11a engage in respect of bores 35 of adjacent female components 12b. The distal ends 33 extend through openings 35 as shown in FIG. 6. The distal ends 33 are then swaged or deformed (not shown) so as to assume a diameter greater than the opening 35 thereby capturing the pins 11a with the opposed side walls 14 of the adjacent female links 12b. The pins 11a and distal ends 33, however, can rotate within bores 34 and openings 35. As can be seen in FIG. 6 the outermost end of opening 35 is countersunk to provide an area in which the enlarged end of distal end 33 can locate.

As explained with the first embodiment, bending of the connector can only occur in one direction from the configuration as shown in FIG. 6. Bending in the opposite direction is prevented by the inter-engagement of the edges 30a of bases 13.

As with the previously described embodiment the side edges 18 and 19 of the walls 14 generally converge to the top edge thereby providing a clearance 21 between adjacent edges 18 and 19 of adjacent walls 14. However, in addition, the lower edges of walls 14 are provided with a curved profile 16a. A corresponding curved relief 17a is provided in the upper surface of base portion 13. This curved portion 16a and the angled upper edges 18 and 19 of walls 14 which provide clearance 21 enable the links 11 to pivot relative to one another. Thus the connector 10 is able to bend so that it can, for example, bend about the sprocket of the operator and also curve in accordance with a guide within the housing of the operator.

As with the first embodiment, the joining means formed by pins 11a, distal ends 33, bores 34 and openings 35 result in the pins 11a extending transversely between the walls 14 and thereby forming the drive elements for engagement with the gear wheel of the operator. Therefore, as with the first embodiment, the joining arrangement is multi-functioned in that it not only provides the joining but also the drive elements but, nevertheless, in a multi-link connector which has a considerably more aesthetic appearance than a conventional chain. Thus, separate pinning by secondary rivets or pins is not required.

By the use of links of the type disclosed herein, a small dimensioned multi-link connector can be provided for use with compact dimensioned window operators yet provide the necessary ability to drive and control the chain throughout operation of the operator. The links also provide an aesthetically pleasing appearance which is more and more becoming a requirement for window hardware.

What is claimed is:

1. A multi-link connector including a plurality of links joined together by joining means, the links forming a generally channel shaped elongate length with the joining means forming drive elements which extend transversely between walls of the channel shape and are accessible from between the walls, said joining means including a pin projecting from a wall of a link and pivotally fixed to an oppositely disposed wall of an adjacent link.

2. The multi-link connector of claim 1 wherein, each link has a base portion which extends between the wall and oppositely disposed wall of the link, the base portion of each link is engagable to prevent the connector from being bent in a direction other than in one direction away from a substantially straight disposition of the links.

3. The multi-link connector of claim 2 wherein each wall of the links has an edge which is profiled to provide clearance to permit the connector to be bent in said one direction.

4. The multi-link connector of claim 2 wherein the links comprise male and female links oppositely disposed and staggered, edges of adjacent base portions of the male and female links being closely adjacent when the connector or that part of the connector in which said male and female links are located is in a substantially straight disposition of links.

5. The multi-link connector of claim 4 wherein the multi-link connector is able to only be bent in one direction from said substantially straight disposition of links.

6. The multi-link connector of claim 4 wherein the pin is formed integrally with the male link, the pin has a distal end which is enlarged after location in an opening of the female link to prevent the pin from being retracted from said opening.

7. The multi-link connector of claim 6 or claim 4 wherein the wall of each link includes a curved portion which mates with a curved relief of the base portion of an adjacent link.

8. The multi-link connector of claim 6 wherein the opening has a counterbore and an end portion of the pin which includes said distal end is of smaller diameter than the remainder of the pin, said end portion engages in the counterbore, the distal end of the end portion being enlarged after location in the counterbore to prevent retraction of the reduced portion from the counterbore.

9. The multi-link connector of claim 1 wherein the links are die cast metal.

10. The multi-link connector of claim 9 wherein the links are plated.

11. The multi-link connector of claim 1 wherein said oppositely disposed wall includes an opening into which a distal end of a corresponding pin is rotatably engaged, the distal end of the pin being fixed against substantial axial movement relative to said opening to thereby prevent the pin from being retracted from the opening.

12. A window operator comprising a multi-link connector including a plurality of links joined together by joining means, the links forming a generally channel shaped elongate length with the joining means forming drive elements which extend transversely between walls of the channel shape and are accessible from between the walls, said joining means including a pin projecting from a wall of a link and pivotally fixed to an oppositely disposed wall of an adjacent link.

13. The window operator of claim 12 including a driving mechanism drivingly coupled to a toothed gear wheel, teeth of the gear wheel being engagable with the drive elements of the multi-link connector.

* * * * *